Feb. 14, 1939.  F. C. BLANCHA  2,147,141
MECHANICAL COUPLING
Filed Feb. 27, 1937
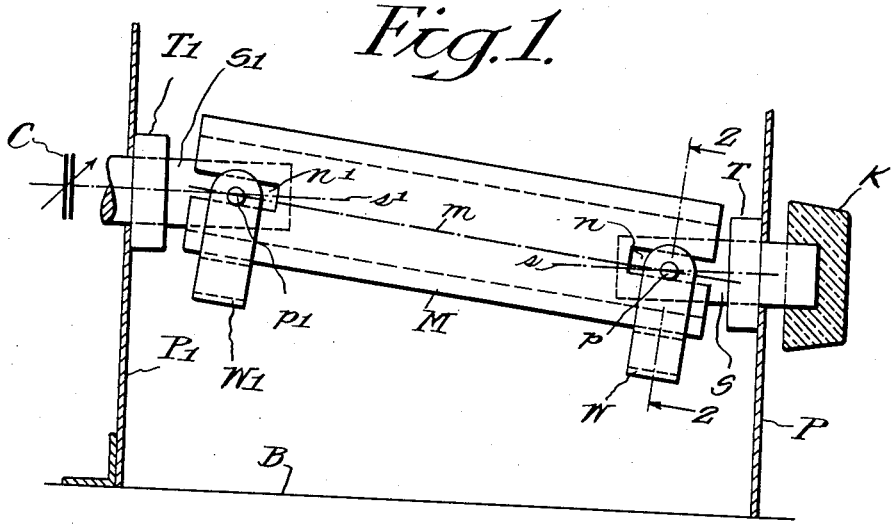
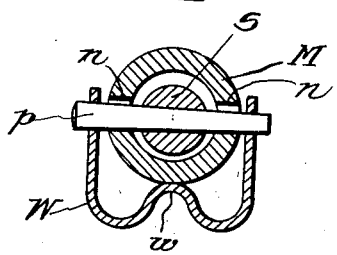
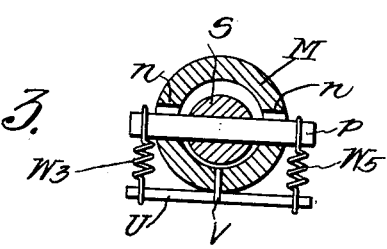
Inventor
Felix C. Blancha Patented Feb. 14, 1939

2,147,141

UNITED STATES PATENT OFFICE 2,147,141

MECHANICAL COUPLING

Felix C. Blancha, Manoa, Pa., assignor to Radio Corporation of America, a corporation of Delaware Application February 27, 1937, Serial No. 128,068

3 Claims. (Cl. 64—8)

This invention relates to mechanical couplings and particularly to couplings for transmitting torque between misaligned shafts.

An object of the invention is to provide a coupling, the operation of which is characterized by substantial freedom from back-lash.

Another object of the invention is to provide a coupling, the operation of which is not adversely affected by wearing down of the parts.

Another object is to provide an electrically insulated universal joint.

Another object of the invention is to provide a simple, inexpensive, compact and trouble-free universal joint which, by reason of its simplicity of attachment, lends itself readily to mass production methods.

Certain details of construction, together with other objects and advantages, will be apparent and the invention itself will be best understood by reference to the following specification and to the accompanying drawing, wherein Figure 1 is a partly diagrammatic side elevation of a pair of misaligned shaft-ends coupled in accordance with the principle of the invention, Figure 2 is a sectional view taken on the line 2—2 of Fig. 1, and Figure 3 is a sectional view of a coupling of alternate construction embodying the invention.

While the invention will be described as applied between the driving and driven shafts of an electrical condenser, it is to be understood that the invention is not limited to such application, the disclosure in this respect being merely illustrative for purposes of explaining the inventive concept.

In Fig. 1, B designates a base or shelf and P the front panel of a radio apparatus. Two misaligned shaft ends are shown at S and $S^1$, respectively. Shaft S is the driving shaft; it is journaled in a bushing T in the front panel and is provided at its outer end with a knob K to which torque may be manually applied. Shaft $S^1$ is the driven shaft; it is journaled in a bushing $T^1$ in the front plate $P^1$ of a variable condenser, symbolically indicated at C.

In the drawing, the axes $s$ and $s^1$ of shaft S and $S^1$ are parallel, but not in alignment. As the description proceeds, however, it will be apparent that the coupling device of the invention may be employed to interconnect a pair of shafts whose axes intersect, in which latter case optimum performance is ensured when the angle formed by the intersection of the shaft axes is substantially no greater than, say 15°.

For the purpose of connecting the misaligned shafts S and $S^1$ in torque transfer relation, the invention provides a hollow coupling member M. The ends of shafts S terminate within member M out of contact with the inner surface thereof. The axis $m$ of member M intersects the axes $s$ and $s^1$ of the driving and driven shafts S, $S^1$. In the illustrated embodiments of the invention, member M is in the form of an elongated hollow cylinder or tube formed of porcelain or other insulating material and is provided with a pair of slots $n$ and $n^1$, one at each end, which extend inwardly along and parallel to axis $m$. If desired, one slot may be at a right angle to the other slot.

Each shaft S, $S^1$ carries a pin $p$, $p^1$, respectively, which, to ensure against displacement, may be of tapered construction, as shown in Fig. 2. Pins $p$ extend entirely through the shafts to which they are affixed and through the slots $n$ and terminate beyond the outer periphery of coupling member M. The terminal ends or "arms" of pin $p$ are of a diameter sufficiently small to permit of relative movement with respect to the inner surfaces of the slots $s$.

When torque is applied to shaft S, as through knob K, rotary movement will be imparted to coupling member M through pin $p$. The ends or arms of the pin in rotating pivot about the axis $m$, the relatively loose fit of the pin $p$ in the slot $n$ permitting this. When shaft S has been rotated, say, 180° the axis of the pin will intersect the axis $m$ at an angle other than 90°, the exact angle formed by the intersection of these axes being dependent upon the degree of misalignment of the driving and driven shafts. When shaft S has been rotated 180° continued movement will result in a return or reciprocating, pivotal, sliding movement of the pin on the slot surface. In order to prevent lost motion or "back lash" which might otherwise occur when torque is applied, means are provided for maintaining pins $p$ and $p^1$ against one or the other of the surfaces of the slots with which they are associated. In Figs. 1 and 2, pins $p$ and $p^1$ are shown maintained in slidable contact with the "lower" surfaces respectively of the slots $n$ and $n^1$ by means of W-shaped springs W and $W^1$. The outer legs of springs W are secured to the pin ends and the central legs $w$ contact the outer surface of the coupling cylinder M.

Fig. 3 shows a modified construction wherein a pair of spiral springs are employed for maintaining the inner surfaces of the slots in the coupling member M against the arms on the driving and/or driven shafts. Here two spiral springs $W^3$, $W^5$ are employed, one adjacent each end or arm of pin $p$. The springs are secured at their opposite ends to a cross bar U which is anchored to the coupling cylinder M as by a stud V embedded in its surface.

As in the earlier described embodiment, when torque is applied to the driving shaft, rotary motion is imparted to the coupling member M and hence to the driven shaft $S^1$ through pins $p$. Pins $p$ at the same time are subject to the previously described compensating pivotal movement about the axis of cylinder M. Obviously, wear caused by friction between pins $p$ and the surface of the slots $n$ will be taken up by the springs so that operation of the device is not adversely affected by prolonged use.

Other modifications of the invention will suggest themselves to those skilled in the art. It is to be understood, therefore, that the invention is not to be limited except as required by the prior art and by the spirit of the appended claims.

What is claimed is:

1. In combination, a driving shaft and a driven shaft having misaligned axes, a hollow coupling member having an axis which intersects said shaft axes and within which said shafts terminate, and means individual to said shafts and rigidly secured thereto for connecting said shafts in torque transfer relation with said coupling member, and spring means for maintaining said connecting means in slidable contact with said coupling member upon the application of torque to said driving shaft.

2. In combination, two shaft ends having misaligned axes, a pair of rigid oppositely located arms normal to said axes and extending outwardly beyond the periphery of said shafts, a hollow cylindrical coupling member in which said shaft ends terminate out of contact with the inner walls thereof, a slot in each end of said cylinder and within which said shaft arms are respectively seated, the width of said slots being greater than the diameter of said arms to permit of movement of said arms in said slots, and means for maintaining the arms on each shaft in slidable contact with a given surface of its slot irrespective of the direction of rotation of said shafts.

3. In combination, two rotatable shafts having misaligned axes, one of said shafts having a slotted hollow end within which the other of said shafts terminates, said other of said shafts having a pair of oppositely located arms normal to its axis and seated within the slot in the hollow end of said first mentioned shaft, the surfaces of said slot being spaced apart a distance greater than the diameter of said arms, and tensioned means for maintaining said arms in contact with a surface of said slot whereby to prevent back lash between said shafts when the direction of rotation is reversed.

FELIX C. BLANCHA.